United States Patent Office 3,508,625
Patented Apr. 28, 1970

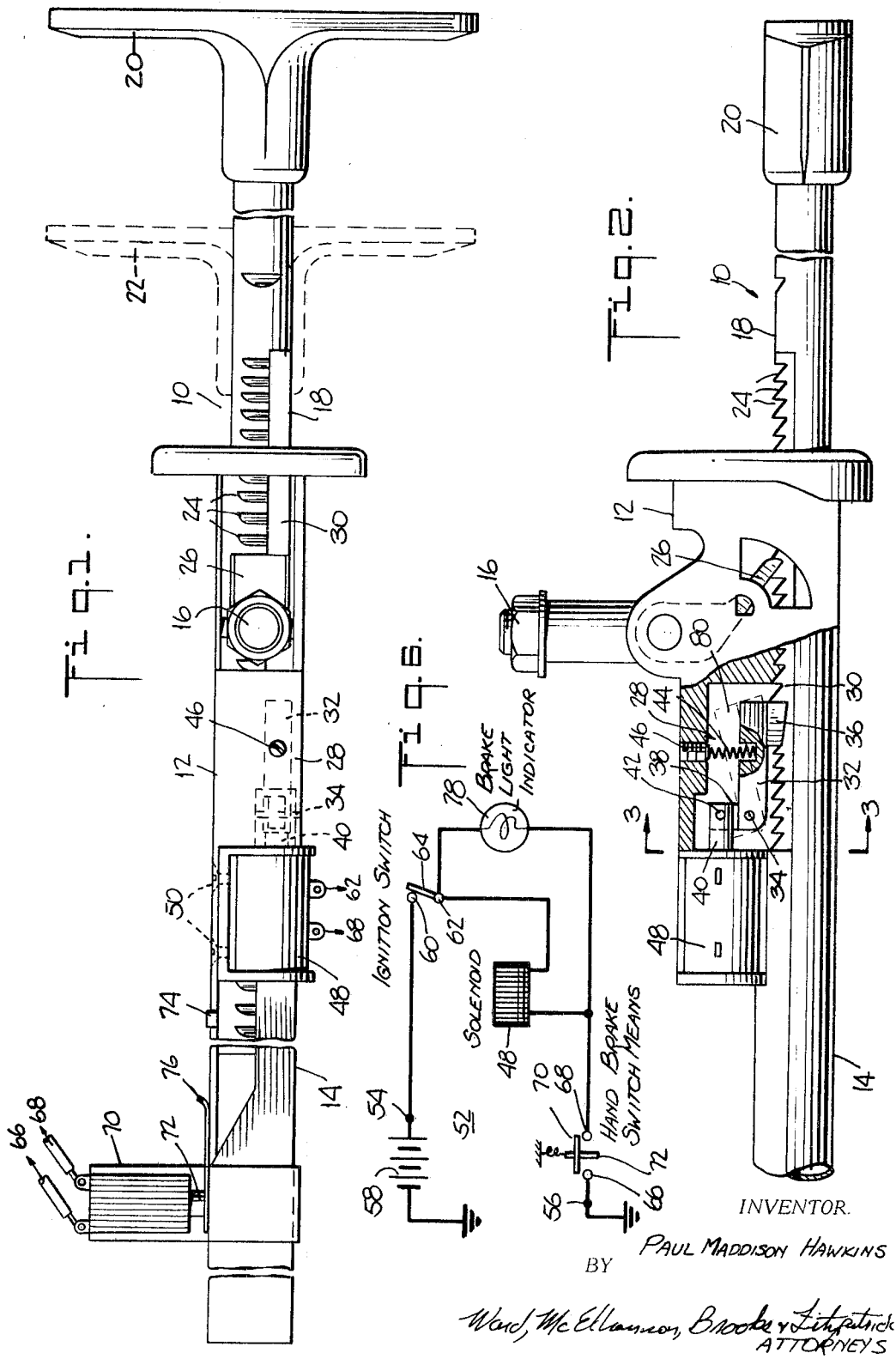

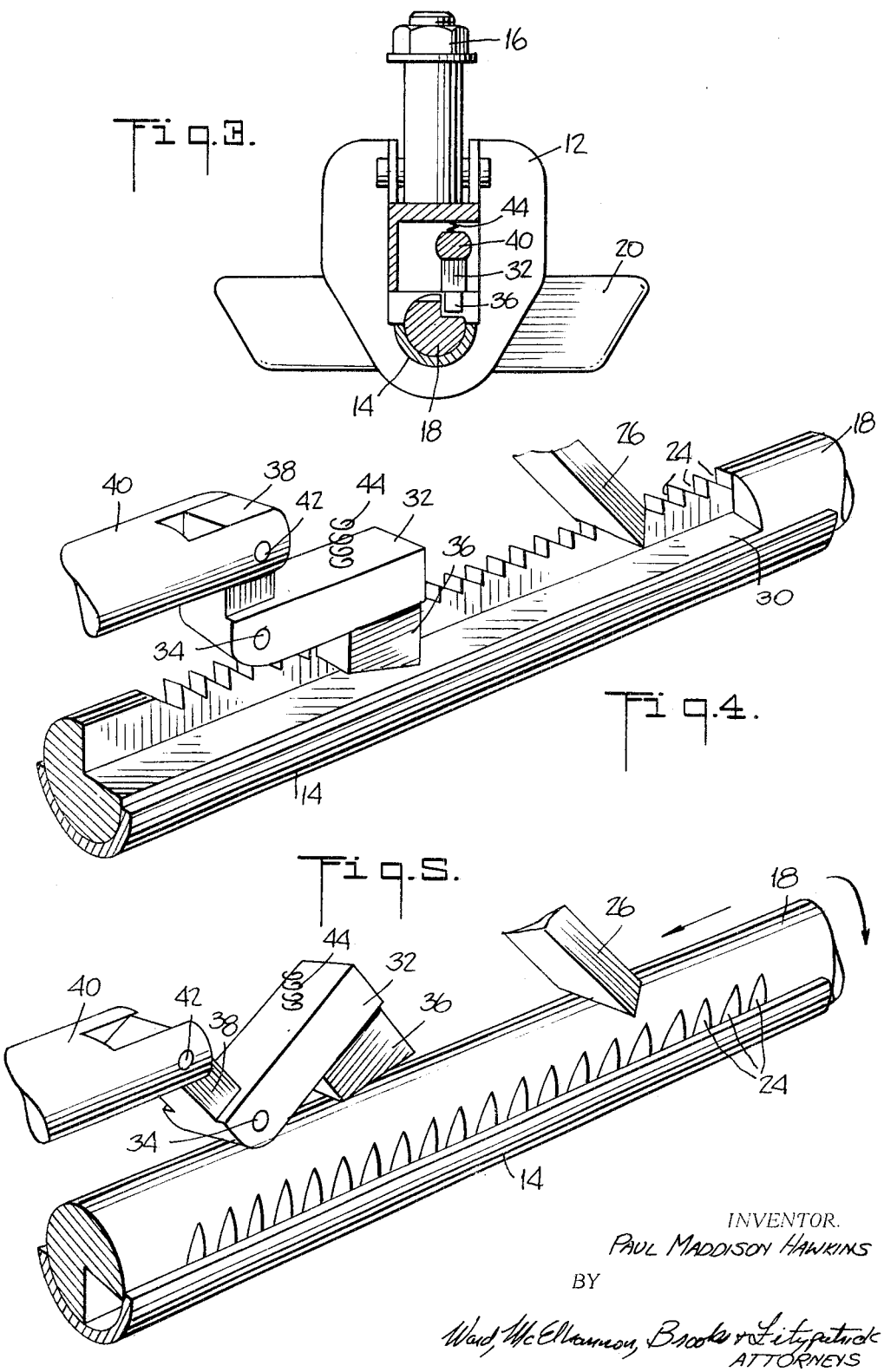

3,508,625
VEHICULAR SECURITY BRAKE DEVICE
Paul Maddison Hawkins, Stillwater, Minn., assignor to General Alarm Corporation, New York, N.Y., a corporation of Delaware
Filed May 23, 1968, Ser. No. 731,476
Int. Cl. B60r 25/00
U.S. Cl. 180—114
20 Claims

ABSTRACT OF THE DISCLOSURE

Vehicular security device which is automatically activated and deactivated by the operation of the starting or ignition switch of the vehicle without further action on the part of the operator. To this end a vehicular hand brake actuator is provided for movement between brake actuating and brake deactuating positions and vehicular security locking means are provided for locking the actuator in the brake actuating position. In addition circuit means are provided for automatically operating the vehicular security lock means in response to the condition of the starting or ignition switch of the vehicle.

---

This invention relates to vehicular security means for protecting motor vehicles against theft, and more particularly, to an apparatus and electric circuit for automatically locking the hand brake of a motor vehicle in the activated or "on" position.

Those persons skilled in the art are aware of the constant and continuing efforts to improve the security of motor vehicles against unwarranted removal or theft, as well as the fact that while numerous improvements have been made over the years, a satisfactory and simple measure for vehicular security has not yet been achieved. Thus, various vehicular security devices have been suggested which include concealed ignition switches, alarms sensitive to vibrations, means disconnecting the vehicular steering mechanism during non use of the vehicle and means locking the vehicular hand brake in the engaged or "on" position.

Most, if not all, of these mentioned prior art vehicular security devices are subject to the drawback that special action must be taken by the driver of the motor vehicle either to put such devices in operative condition before leaving the vehicle or, if such devices are already operative, to render such devices inoperative when authorized use of the vehicle is desired. Too often, the operator of the vehicle fails to take such special action with the result that either the vehicle is left unprotected by the failure to connect the security device before leaving the vehicle, or the security device is subject to damage by failure to disconnect the security device before use of the vehicle.

The present invention contemplates the provision of an improved vehicular security device which is automatically activated and deactivated by the operation of the starting or ignition switch of the vehicle without further action on the part of the operator.

In accordance with one aspect of the present invention there is provided apparatus for automatically locking and unlocking the hand brake of a motor vehicle. The apparatus includes a vehicular hand brake actuator moveable between hand brake actuating and hand brake deactuating conditions. Means are provided for holding the vehicular hand brake actuator in the brake actuating or "on" condition when so positioned by the operator of the vehicle upon the parking of same. Vehicular security lock means are also provided for locking the hand brake actuator in the brake actuating condition and for preventing the release of the above mentioned means.

Circuit means are further provided for automatically operating the vehicular security lock means in response to the condition of the starting or ignition switch of the vehicle whereby the security lock means is automatically operated to lock and unlock the vehicular hand brake actuator.

In accordance with another aspect of the present invention the hand brake actuator includes a shaft constructed to actuate the hand brake and mounted for movement between brake actuating and brake deactuating conditions. Additionally, the mentioned means for holding the hand brake actuator in the brake actuating condition includes a latching pawl constructed to engage one of a plurality of latching slots provided in the shaft of the hand brake actuator. The pawl and the shaft are further constructed to disengage the pawl from the engaged slot of the hand brake actuator upon rotation of the shaft. The shaft of the brake actuator also has a security locking slot provided therein, and the mentioned vehicular security lock means is mounted for engagement with the security locking slot. The vehicular security lock means and the security locking slot provided in the shaft of the hand brake actuator are constructed to prevent rotation of the shaft and thus to prevent the release of the latching pawl from the latching slot in the shaft of the hand brake actuator.

In accordance with still another aspect of the present invention, an electric circuit is provided for actuating a vehicular locking device and, in the preferred form, includes vehicular ignition switch means for connecting a power source to said circuit to energize same. A hand brake indicator means is connected in the circuit and is operable when the circuit is energized to indicate the condition of the hand brake. Hand brake switch means are also connected in the circuit and are adapted to deenergize the electric circuit upon deactivation of the vehicular hand brake; and security lock operating means are also connected in the circuit and are constructed automatically to actuate the mentioned vehicular locking device. While this aspect of the present invention is described in connection with locking the hand brake of a motor vehicle, the electric circuit may be used in conjunction with other vehicular security applications.

There has thus been outlined rather broadly the more important features of the invention in order that the detailed description thereof that follows may be better understood, and in order that the present contributions to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit and scope of the invention.

Certain specific applications of the invention have been chosen for purposes of illustration and description, and are shown in the accompanying drawings forming a part of the specification wherein:

FIG. 1 is a top view showing a vehicular hand brake actuator in accordance with the present invention;

FIG. 2 is a side view, partially broken away, of the vehicular hand brake actuator of FIG. 1, and showing the vehicular security lock means in accordance with the present invention;

FIG. 3 is a sectional view taken along line 3—3 of FIG. 2;

FIG. 4 is an enlarged perspective view showing the vehicular security lock means in accordance with the present invention when in the locking condition;

FIG. 5 is an enlarged perspective view showing the vehicular security lock means in accordance with the present invention when in the unlocking condition; and FIG. 6 is a circuit diagram of an electric circuit for operating the vehicular security lock means of the present invention.

Referring now to the drawings in detail, and more specifically to FIGS. 1 and 2, there is shown a vehicular hand brake actuator 10 constructed in accordance with the present invention. The actuator 10 is mounted in a housing 12 for movement in a manner to be explained hereinafter. As shown in FIGS. 1 to 4, the housing 12 includes a hollow tubular section 14 whose internal surface provides a bearing surface for the mentioned movement of the hand brake actuator 10. The housing 12 also includes a mounting bolt 16 (FIGS. 1 and 2) for rigidly securing the housing 12 to the chassis of the vehicle.

As shown in FIGS. 1 and 2, the actuator 10 comprises a substantially round shaft 18 and a handle 20 integral therewith. The shaft 18 extends through the housing 12 and is connected in a well known manner at its end opposite the handle 20 to a vehicular hand brake (not shown) of a motor vehicle. The shaft 18 of the actuator 10 is constructed to slide on the internal bearing surface provided by the tubular section 14 of the housing 12 to actuate and deactuate the hand brake. Thus, as shown in FIG. 1, when the hand brake actuator 10 is moved to the position shown in solid outline, the vehicular hand brake is in the activated or "on" condition. Also when the vehicular hand brake actuator 10 is moved inwardly to the position shown in phantom outline 22 in FIG. 1, the hand brake is in the deactivated or "off" condition. The actuator 10 is also preferably spring biased in a well known manner to the brake deactuating or "off" position by a tension spring (not shown) suitably attached to the shaft 18.

As shown in FIGS. 1 and 2, a plurality of horizontally extending latching slots 24 are provided along substantially the whole longitudinal length of a radial section of the substantially round shaft 18. A latching pawl 26 is mounted on the housing 12 and is constructed to engage the latching slots 24. In addition, the pawl 26 is preferably spring biased (not shown) to bear against the surface of the shaft 18 and automatically engage the slots 24 thereof in well known "ratchet" fashion. The pawl 26 and the slots 24 constitute means for holding the vehicular hand brake actuator 10 in the brake actuating or "on" condition.

The brake actuator 10 thus far described operates as follows. Assuming the vehicular hand brake actuator 10 is in the brake deactuating or "off" position as shown in the phantom outline 22 of FIG. 1 the vehicular hand brake actuator 10 is manually moved by the operator of the motor vehicle by pulling on the handle 20 of the actuator 10 against the spring bias provided on the shaft 18, and assumes the brake actuating or "on" position shown in solid outline in FIG. 1. Simultaneously, the pawl 26 engages a slot 24 of the shaft 18 of the actuator 10 thereby holding the hand brake actuator 10 in the brake actuating position against the mentioned spring bias. As shown in FIG. 4 and 5, when it is desired to deactivate the brake, the actuator 10 is released by manually rotating the shaft 18 by means of the handle 20 in such a manner that the radial sector of the shaft section 18 containing the slots 24 is rotated out of engagement with the pawl 26. Thus, the actuator 10 is free to move under the influence of the mentioned spring bias on the bearing surface provided by the housing 12 to the hand brake deactuating or "off" position.

Returning to FIGS. 1 and 2, in accordance with the present invention a vehicular security lock means (shown generally at 28) is provided on the housing 12 for locking the brake actuator 10 in brake actuating position thus preventing its movement to the brake deactuating position. To this end, a longitudinally extending slot 30 is provided along the shaft 18. The slot 30 constitutes a security locking slot. In addition, a locking arm 32 is mounted in the housing 12 pivotally to move about a fixed point defined by the engagement of the locking arm 32 with a pin 34 secured in the housing 12. As shown in FIGS. 2 and 3, the locking arm 32 includes a slot-engaging portion 36 constructed to depend into the security locking slot 30, as well as an upwardly extending portion 38 pivotally connected to a moveable plunger 40 by a pin 42. In addition, as shown in FIG. 2, the locking arm 32 is spring biased by compression spring 44, secured in the housing 12 by means of a screw 46, so that the slot engaging portion 36 automatically depends into the security locking slot 30.

The plunger 40, pivotally connected to the locking arm 32, is moved under the control of a solenoid magnet 48 which surrounds part of the plunger 40 and which is mounted to the housing 12 by screws 50 shown in FIG. 1. The solenoid 48 constitutes a security lock-operating means for actuating the lock means 28; and as shown in FIG. 6, the solenoid 48 also constitutes a component of the circuit means (shown generally at 52) for operating the security lock means 28. The circuit means 52 includes input terminals 54 and 56 respectively, for connecting the circuit means 52 to a D.C. power source 58. The power 58 is preferably the same electrical power source utilized in the vehicle for starting the vehicle etc. The input terminal 54 of the circuit means 52 is connected to the remaining elements of the circuit means 52 by a serial connection provided by terminals 60 and 62 of an ignition switch 64. Ignition switch 64 may be the same switch utilized in the motor vehicle to actuate the motor starter. Similarly, the input terminal 56 of the circuit means 52 is connected with the remaining elements of the circuit means 52 by a serial connection provided by terminals 66 and 68 of the hank brake switch 70. This switch 70 is preferably the same switch used to actuate the hand brake indicator light in automobiles. As shown in FIG. 1, switch 70 is mounted on the housing 12 and includes an actuating shaft 72 for engaging a tab 74 provided on the shaft 18 of the brake actuator 12. Tab 74 constitutes switch actuating means for operating the switch 70. In the preferred embodiment, and as diagrammatically shown in FIG. 6, the switch 70 is spring biased to the closed position. Returning to FIG. 1, it will be noted that the tab 74 provided on the shaft 18 is relatively positioned in relation to the actuating shaft 72 of the switch 70 so as to bear against the actuating shaft 72 by means of leaf spring 76 and move the switch to the open position when the brake actuator 10 is moved to the brake deactuating or "off" position.

Referring to FIG. 6, it will be noted that the solenoid 48 is connected in circuit engagement with the terminal 68 of the switch 70 and with the terminal 62 of the ignition switch 64. Similarly, a brake light indicator 78 is serially connected to the terminal 68 of the switch 70 and to the terminal 62 of the ignition switch 64. The brake light indicator 78 constitutes means for indicating the condition of the vehicular hand brake. In the preferred embodiment the brake light indicator 78 is connected to be actuated whenever the vehiclar hand brake is in the activated or "on" condition. It will be noted that, except for the inclusion of the solenoid 48, the above described circuit means 52 is generally comprised of electrical elements constituting the brake light circuit utilized in many present automobiles.

In operation, whenever the actuator 10 is in the brake actuating or "on" position and the ignition switch 64 of the motor vehicle is open or "off," the circuit means 52 is deenergized. Under these conditions, the vehicular security lock means 28 assumes the locking position shown in FIGS. 1 to 4. Thus, the slot engaging portion 36 of the locking arm 32 is biased under the influence of compression spring 44 to depend into the security locking slot 30. As shown in FIG. 3, when the slot engaging portion 36 of the locking arm 32 is so positioned within the security slot 30, it prevents rotation of shaft section 18 of the actuator 10, and thus also prevents movement of the actuator 10 to the brake deactuating or "off" position.

It will be noted that since the slot engaging portion 36 of the locking arm 32 is spring biased to engage the security locking slot 30, the vehicular hand brake actuator 10 is automatically locked against rotation whenever both the ignition switch 64 of the automobile is turned "off" and the vehicular hand brake actuator 10 is moved to the brake actuating or "on" position.

On authorized use of the vehicle, the ignition switch 64 is closed by the operator of the motor vehicle, thus energizing the circuit means 52. Upon closing of the ignition switch 64, the solenoid magnet 48 is excited so as to move the plunger 40 in a direction such that the slot engaging portion 36 of the locking arm 32 is lifted out of the security locking slot 30. This arrangement is shown in phantom outline at 80 of FIG. 2. It will be noted that this operation is carried out automatically upon the closure of the ignition switch 64, and thus no special action is needed by the operator of the vehicle to release the security lock means 28 from the locking position. Thus, the operator of the motor vehicle may freely rotate the shaft section 18 of the hand brake actuator 10 to release the latching pawl 26 and to move the hand brake actuator 10 to the brake deactuating position.

As the hand brake actuator 10 is moved to the brake deactuating position, the tab 74 provided in the shaft section 18 engages the leaf spring 76 of the hand brake switch 70 to move the actuating shaft 72 to open the switch 70. This action deenergizes circuit means 52 so that the plunger 40 is moved back to its position shown in FIG. 2 under the influence of the compression spring 44 provided on the locking arm 32. Thus, the vehicular security lock means 28 is repositioned for locking the vehicular hand brake actuator 10 whenever the latter is therafter again moved to the brake actuating or "on" position.

It will be noted that during normal operation of the motor vehicle, and after the opening of switch 70, the solenoid 48 remains inactive and thus no current is drawn from the power supply 58.

Thus it may be seen from the above that in accordance with the present invention there is provided a vehicular security locking means which is automatically activated and deactivated by the starting or ignition switch of the vehicle and no special action is required of the operator of the motor vehicle in order to connect or disconnect the security device.

Having thus described the invention with particular reference to the preferred form thereof, it will be obvious to those skilled in the art to which the invention pertains, after understanding the invention, that various changes and modifications may be made.

What is claimed as new and desired to be secured by Letters Patent is:

1. Electric circuit for actuating a vehicular security locking device, said circuit including vehicular ignition switch means for connecting a power source to said circuit to energize same, vehicular hand brake indicator means connected in said circuit and operable when said circuit is energized to indicate the condition of the vehicular hand brake, hand brake switch means connected in said circuit and adapted to deenergize said circuit upon deactivation of the vehicular hand brake, and vehicular security lock operating means connected in said circuit and constructed to be actuated when said circuit is energized.

2. Electric circuit as in claim 1 wherein said vehicular security lock operating means comprises a solenoid having a moveable plunger, said plunger being moved by said solenoid when said circuit is energized.

3. Electric circuit as in claim 1 further including input terminals for applying said power source to said circuit, and wherein said vehicular ignition switch means completes a serial connection between said input terminals and the remainder of said circuit.

4. Electric circuit as in claim 1 further including input terminals for applying said power source to said circuit, and wherein said hand brake switch means establishes a serial connection between said input terminals and the remainder of said circuit.

5. Electric circuit for actuating a vehicular security locking device, said circuit including input terminal means for connecting said circuit to a power source for energizing said circuit, vehicular hand brake indicator means connected in said circuit and operable when said circuit is energized to indicate the condition of the vehicular hand brake, hand brake switch means connected in said circuit and adapted to deenergize said circuit upon deactivation of said vehicular hand brake, and vehicular security lock operating means connected in said circuit and constructed to be actuated when said circuit is energized, said hand brake switch means completing a serial connection between said input terminal means and the indicator means and vehicular security lock actuating means.

6. Electric circuit as in claim 5 wherein said indicator means and said vehicular security lock operating means are connected in parallel in said circuit.

7. Electric circuit as in claim 5 wherein said vehicular security lock operating means includes a solenoid connected in parallel with said indicator means.

8. Electric circuit for actuating a vehicular security locking device, said circuit including vehicular ignition switch means for connecting a power source to said circuit to energize same, hand brake switch means connected in said circuit and adapted to deenergize said circuit upon deactivation of the vehicular hand brake, and vehicular security lock operating means connected in said circuit and constructed to be actuated when said circuit is energized.

9. Apparatus for automatically locking the hand brake of a vehicle, said apparatus including a vehicular hand brake actuator moveable between brake actuating and brake deactuating conditions, first means for holding said actuator in brake actuating condition, vehicular security lock means for locking said actuator in the actuating condition and circuit means for operating said security lock means, said circuit means including input terminal means for connecting said circuit to a power source to energize said circuit, vehicular security lock operating means responsive to the energization of said circuit for operating said vehicular security lock means, and switch means connected in said circuit and adapted to deenergize said circuit upon deactivation of the vehicular hand brake.

10. Apparatus as in claim 9 wherein said vehicular security lock means is mounted for movement between locking and unlocking conditions and is resiliently biased to the locking condition, and said circuit means is arranged to move said vehicular security lock means to the unlocking condition upon energization of said circuit.

11. Apparatus as in claim 9 wherein said vehicular hand brake actuator includes a shaft constructed to actuate said vehicular hand brake and mounted for movement between brake actuating and brake deactuating positions, said shaft having latching slots defined therein, and wherein said first means includes latching pawl means constructed to engage the latching slots of said shaft, said latching pawl and said shaft further being constructed to disengage said latching pawl from the latching slots upon rotation of said shaft.

12. Apparatus as in claim 11 wherein said vehicular security lock means is constructed to prevent rotation of said shaft when in said locking condition.

13. Apparatus as in claim 12 wherein said shaft has a security locking slot defined therein and said security lock means is mounted for engagement with said security locking slot whereby said security lock means prevents rotation of said shafting when in said locking condition.

14. Apparatus as in claim 9 wherein said vehicular hand brake actuator includes a shaft constructed to actuate a vehicular hand brake and mounted for movement between brake actuating and brake deactuating positions, and wherein said hand brake switch means is mounted for engagement with said shaft, said shaft also having switch actuating means for operating said hand brake switch means.

15. Apparatus as in claim 14 wherein said hand brake switch means is biased to the closed position and wherein said switch actuating means is positioned on said shaft to open said hand brake switch means when said shaft is moved to the brake deactuating position.

16. Apparatus as in claim 15 wherein said circuit means further includes hand brake indicator means connected in said circuit for indicating the condition of said vehicle hand brake.

17. A vehicular security hand brake actuator comprising a housing for said hand brake actuator, a shaft constructed to actuate a vehicular hand brake and mounted in said housing for movement between brake actuating and brake deactuating position, latching means mounted in said housing for latching said shaft in the brake actuating position, said shaft and said latching means being constructed to release said latching means from said shaft by relative rotation between said shaft and said housing within said housing, and vehicular security lock means mounted in said housing for engaging said shaft and constructed to prevent said relative rotation between said shaft and said housing when said vehicular hand brake is in the brake actuating position.

18. A vehicular security hand brake as in claim 17 wherein said shaft has a slot defined therein and said security locking means is mounted for engagement with said slot whereby said security locking means prevents rotation of said shaft when said vehicular hand brake is in the brake actuating position.

19. A vehicular hand brake as in claim 18 wherein said vehicular security locking means includes a solenoid mounted in said housing and having a moveable plunger, said plunger operating a locking arm for engaging said slot and constructed for movement between slot engaging and disengaging positions.

20. A vehicular hand brake as in claim 19 wherein said locking arm is biased to the slot engaging positions and wherein said security locking means is arranged to move said plunger to the slot disengaging position.

References Cited

UNITED STATES PATENTS

| | | | |
|---|---|---|---|
| 2,553,753 | 11/1946 | Devor | 70—181 |
| 2,584,938 | 2/1952 | Sweeny et al. | 340—69 |
| 2,789,667 | 4/1957 | Tannenbaum et al. | 188—265 X |
| 2,826,091 | 3/1958 | Halsig | 74—531 |
| 2,968,378 | 1/1961 | Yanda. | |
| 3,119,458 | 1/1964 | Fritz | 180—114 |
| 3,380,549 | 4/1968 | Hille | 180—114 |
| 3,454,126 | 7/1969 | Nash | 180—82 |

FOREIGN PATENTS 864,271 1/1941 France.

KENNETH H. BETTS, Primary Examiner

U.S. Cl. X.R.

70—181; 74—503; 340—69